United States Patent [19]
Crayton et al.

[11] Patent Number: 5,710,514
[45] Date of Patent: Jan. 20, 1998

[54] HYDRAULIC CYLINDER PISTON POSITION SENSING WITH COMPENSATION FOR PISTON VELOCITY

[75] Inventors: John W. Crayton, Washington; Eric F. Lee, Peoria Heights, both of Ill.; Denny Morgan, San Diego, Calif.; Dennis L. Schumacher, Eureka, Ill.

[73] Assignee: Caterpillar, Inc., Peoria, Ill.

[21] Appl. No.: 437,594

[22] Filed: May 9, 1995

[51] Int. Cl.$^6$ ............................................... G01R 33/32
[52] U.S. Cl. .......................... 324/635; 324/636; 364/174
[58] Field of Search .............................. 364/142, 164, 364/174, 175, 176, 177; 324/635, 636

[56] References Cited

U.S. PATENT DOCUMENTS

| | | | |
|---|---|---|---|
| 3,037,201 | 5/1962 | Kelley | 364/164 |
| 3,589,177 | 6/1971 | Merlo | |
| 3,726,191 | 4/1973 | Johnston et al. | |
| 4,321,946 | 3/1982 | Paulos et al. | |
| 4,365,503 | 12/1982 | Ho et al. | |
| 4,588,953 | 5/1986 | Krage | |
| 4,689,533 | 8/1987 | Yang | |
| 4,737,705 | 4/1988 | Bitar et al. | |
| 4,749,936 | 6/1988 | Taplin | |
| 4,757,745 | 7/1988 | Taplin | |
| 4,881,071 | 11/1989 | Monterosso et al. | |
| 4,901,628 | 2/1990 | Krage | |
| 4,952,916 | 8/1990 | Taplin | 340/686 |
| 4,987,823 | 1/1991 | Taplin et al. | 91/361 |
| 5,150,060 | 9/1992 | Bitar | 324/635 |
| 5,182,979 | 2/1993 | Morgan | 92/5 R |
| 5,241,278 | 8/1993 | Bitar | 324/635 |
| 5,325,063 | 6/1994 | Morgan | 324/636 |
| 5,424,962 | 6/1995 | Bouchez | 364/164 |
| 5,438,274 | 8/1995 | Bitar | 324/636 |

FOREIGN PATENT DOCUMENTS

| | | |
|---|---|---|
| 0199224 | 4/1985 | European Pat. Off. |
| 61-021524 | 1/1986 | Japan |

*Primary Examiner*—Ernest F. Karlsen
*Assistant Examiner*—Jose M. Solis
*Attorney, Agent, or Firm*—Steven G. Kibby; Alvin J. Riddles

[57] ABSTRACT

A piston position sensing system in which tabulated resonance width related information is stored in a form correlated with piston travel so that measured resonance width information can be compared with the stored information in determining piston position and compensation for the velocity of the piston is provided by correction for a time difference in serial sensing between the initial and the following extremes of a resonance signal as the piston moves. the compensation is developed from velocity information identified through previous and current processing cycles which assures reliability in detection of the subsequently sensed portion of the resonance signal envelope and enhanced sensitivity and accuracy through automatic application incrementally in a dynamic gain adjustment of the sensing system.

24 Claims, 5 Drawing Sheets

Fig_1_

Fig_2_

Fig_3_

Fig_7_

Fig_8_

| A | B | C | D | E |
|---|---|---|---|---|
| FREQUENCY | PERIOD | DISTANCE | PERIOD * 130944 | COUNTS |
| 100000000/C* | 1/A* | meters | (1/A) * 130944 | (D*) * 16MHz |
| 50000000 | 0.000000020000 | 2.00 | 0.002618880 | 41902.080 |
| 52631579 | 0.000000019000 | 1.90 | 0.002487936 | 39806.976 |
| 55555556 | 0.000000018000 | 1.80 | 0.002356992 | 37711.872 |
| 58823529 | 0.000000017000 | 1.70 | 0.002226048 | 35616.768 |
| 62500000 | 0.000000016000 | 1.60 | 0.002095104 | 33521.664 |
| 66666667 | 0.000000015000 | 1.50 | 0.001964160 | 31426.560 |
| 71428571 | 0.000000014000 | 1.40 | 0.001833216 | 29331.456 |
| 76923077 | 0.000000013000 | 1.30 | 0.001702272 | 27236.352 |
| 83333333 | 0.000000012000 | 1.20 | 0.001571328 | 25141.248 |
| 90909091 | 0.000000011000 | 1.10 | 0.001440384 | 23046.144 |
| 100000000 | 0.000000010000 | 1.00 | 0.001309440 | 20951.040 |
| 111111111 | 0.000000009000 | 0.90 | 0.001178496 | 18855.936 |
| 125000000 | 0.000000008000 | 0.80 | 0.001047552 | 16760.832 |
| 142857143 | 0.000000007000 | 0.70 | 0.000916608 | 14665.728 |
| 166666667 | 0.000000006000 | 0.60 | 0.000785664 | 12570.624 |
| 200000000 | 0.000000005000 | 0.50 | 0.000654720 | 10475.520 |
| 250000000 | 0.000000004000 | 0.40 | 0.000523776 | 8380.416 |
| 333333333 | 0.000000003000 | 0.30 | 0.000392832 | 6285.312 |
| 500000000 | 0.000000002000 | 0.20 | 0.000261888 | 4190.208 |
| 1000000000 | 0.000000001000 | 0.10 | 0.000130944 | 2095.104 |
| 2000000000 | 0.000000000500 | 0.05 | 0.000065472 | 1047.552 |

Fig_9_

Fig_10_

Fig_11_

Fig-12

HYDRAULIC CYLINDER PISTON POSITION
SENSING WITH COMPENSATION FOR
PISTON VELOCITY

TECHNICAL FIELD

The invention relates to the sensing of the position of a piston in a hydraulic cylinder through the use of electromagnetic waves in the cylinder and in particular to increased precision in sensing, achieved through compensation for the velocity of the piston in the detection of an electromagnetic wave resonance in the processing of the piston position information.

This invention arose during development efforts related to the subject matter of U.S. Pat. No. 5,608,332, issued Mar. 4, 1997 and U.S. Pat. No. 5,617,034, issued Apr. 1, 1997.

BACKGROUND AND RELATION TO THE PRIOR ART

Hydraulic cylinder, piston and rod combinations are being increasingly used in many fields, a principal one of which involves the moving and positioning of material and objects. As the various applications of hydraulic cylinder, piston and rod combinations have progressed, more stringent operational criteria are being encountered, and a need has developed to precisely, reliably and continuously sense the position of the piston and it's related displacement parameters, velocity and acceleration.

A promising approach developing in the art employs the correlation of resonances of electromagnetic waves in the cavity that is made up of the cylinder and the piston, with the dimensions of the cavity. In one aspect of this approach, the wave performance is similar to that of an electrical transmission line with shorted ends, in that the resonance frequency of an electromagnetic standing wave correlates inversely with the cavity length.

In one application of the use of electromagnetic waves for piston position sensing, as shown in U.S. Pat. No. 4,588,953, electromagnetic waves are introduced into the cylinder between the closed end of the cylinder and the piston and wherein different counters are employed to increment the introduced frequency and to correlate the sensed frequency signal, when resonance is detected, with the position of the piston.

In U.S. Pat. No. 4,737,705, a coaxial resonant cavity with a central core is employed within which the electromagnetic waves are launched and propagated in the mode referred to as the transverse electromagnetic wave (TEM) mode. The cylinder on the rod side of the piston is one type of coaxial cavity.

In European Patent Office (EPO) published application number 0 199 224 published Oct. 29, 1986, in a hydraulic cylinder cavity between the closed end and the piston, a variable threshold is employed to distinguish particular frequencies out of a broad range of frequencies.

In U.S. Pat. No. 5,182,979, compensation, through equalization, is provided for differences in insertion losses as the linear extension of the piston and rod in the cylinder takes place.

In U.S. Pat. No. 5,325,063 identification of a fundamental resonance frequency is enhanced by the use of positive and negative slope intercepts of a resonance signal respect to a reference level, where the positive slope is at the lower frequency and the negative slope is at the higher frequency.

As progress in the art of electromagnetic wave piston position sensing in hydraulic cylinders continues, greater precision is being sought and accommodation for the many items that can affect accuracy is needed.

SUMMARY OF THE INVENTION

A piston position sensing system where tabulated resonance signal width parameter related information is stored in a form correlated with piston travel so that measured resonance signal width information as the piston travels can be compared with the stored information for determining piston position; and, compensation is provided for the effect of piston velocity in a hydraulic cylinder electromagnetic wave piston position sensing system, that employs identification of a width parameter of a resonance signal such as positive and negative slope intercepts of a resonance signal with respect to a reference level. The compensation is achieved by calculating velocity and then using the calculated velocity value to correct the position of the initial intercept of the resonance signal with a reference level.

The correction assures reliability in detection of the subsequently sensed slope of the resonance signal and enhanced sensitivity and accuracy through automatic application incrementally in a dynamic gain adjustment.

DESCRIPTION OF THE INVENTION

In one type of piston position sensing system that employs electromagnetic waves in the fluid of a hydraulic cylinder, a varying frequency signal is transmitted into the hydraulic fluid in the cylinder. The varying signal covers the range of frequencies at which resonance of the cavity that is made up of the cylinder, the piston and the cylinder end, will take place over the range of piston travel. A frequency signal is sensed in the hydraulic fluid and is delivered to a signal receiver where information is extracted from the sensed frequency signal that permits identification of the position and motion parameters of the piston.

In the hydraulic cylinder cavity there is high loss of the transmitted signal except at a resonance frequency which is at a piston position or cavity length where energy is coupled into a particular mode standing wave thereby producing a significant signal.

There are variations in position sensing systems in the art among: having the cavity on the rod or on the head side of the piston; the excitation of particular mode standing waves; and the sensing of a harmonic other than the fundamental of a particular resonance frequency. For purposes of simplicity and clarity of explanation in the preferred embodiment, a cavity on the rod side of the piston, excitement in the TEM mode and the sensing of the fundamental of the particular resonance frequency for the particular piston position or cavity length, will be discussed.

The frequencies at resonance are lower when the cavity is longer and are higher when the cavity is shorter. Correspondingly the amplitude of each resonance will vary with the cavity length, the lower amplitudes being at the lower frequencies and the higher amplitudes being at the higher frequencies. The resonance signal is a band of frequencies that rises sharply to a peak region and then declines. In the detection of the resonance, the shape of the peak region of the signal and the device and service differences in cylinders that operate to limit use of amplitude in determining the location of the resonance.

The technique of detecting the positive and negative intercepts of the resonance envelope with respect to a reference level, as described in U.S. Pat. No. 5,325,063 is very effective in identifying a resonance signal by a width parameter.

There is, however, a built in precision limitation in the use of the positive and negative intercepts in that the intercept events occur serially, are separated in time, and thus cannot be simultaneously detected. In accordance with the invention the accuracy of resonance information developed from the sensing of a width parameter of the resonance signal such as the positive and negative intercepts with respect to a reference is enhanced through the use of a correction factor representing the velocity of the piston which in turn operates to provide a computational equivalent to being able to detect both of the positive and negative intercepts at the same time. Further, in accordance with the invention the velocity compensation is achieved through the use of a ratio of the difference in frequency between the intercepts of the present resonance in relation to the difference in frequency between the intercepts of the immediately previously processed resonance. The velocity correction prevents serious errors and simplifies computations for selecting dynamic gain adjustment.

Figure 1:
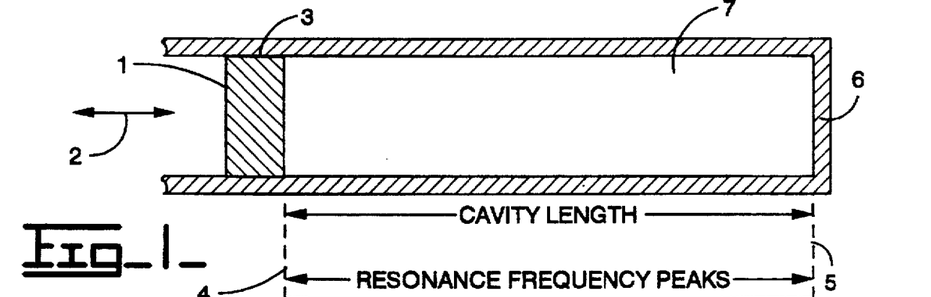
FIG. 1 is an illustration of the dimensional correlation of the hydraulic cylinder resonance frequency peaks with piston position between the extended and collapsed limits of piston travel.

Referring to FIG. 1, there is shown an illustration of the dimensional correlation of the hydraulic cylinder resonance frequency peaks with piston position. In FIG. 1, a piston 1 travels as indicated by the double directional arrow 2 in a cylinder 3 between a limit 4 at the expanded end of the cavity or travel and a limit 5 in the vicinity of a closed or head end 6 where the cavity is considered collapsed. The length between the piston 1 and the head 6 is the cavity containing hydraulic fluid introduced and removed through ports, not shown, and in which electromagnetic waves in frequencies that vary over the range of frequencies at which resonance will occur within the piston travel are introduced through a coupler, not shown.

Further, in FIG. 1 in the dimensionally correlated graph of Resonance Frequency Peaks vs Amplitude, the curve 8 depicts the nonlinear increase in fundamental resonance amplitude and frequency with decrease in cavity length as the piston travels from the extended cavity limit 4 toward the collapsed cavity limit 5.

Figure 2:
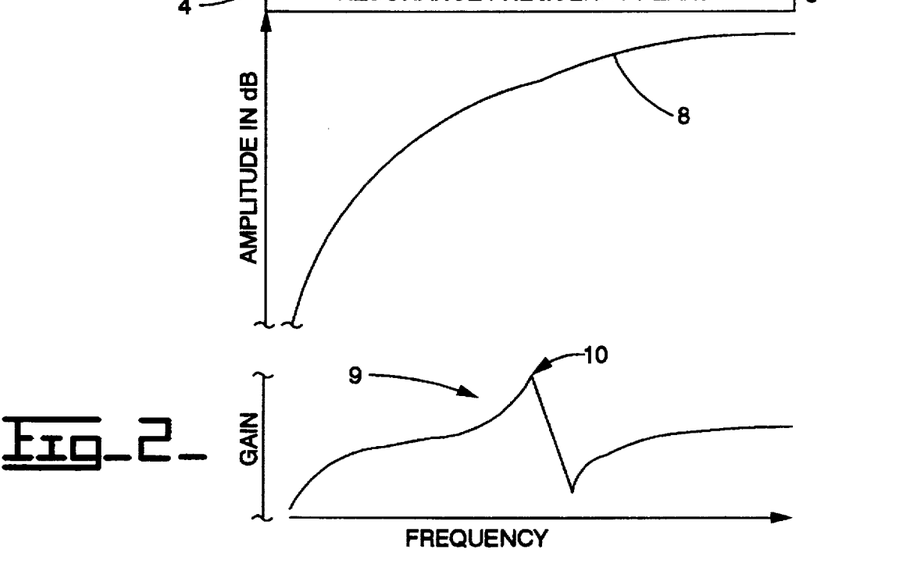
FIG. 2 is an illustration of a portion of a hydraulic cylinder transfer characteristic curve at a resonance frequency peak.

Referring to FIG. 2, there is illustrated a portion of a hydraulic cylinder transfer characteristic curve depicting the general shape of a resonance frequency signal 9, which in turn is an envelope of frequencies with a peak region 10.

Figure 3:
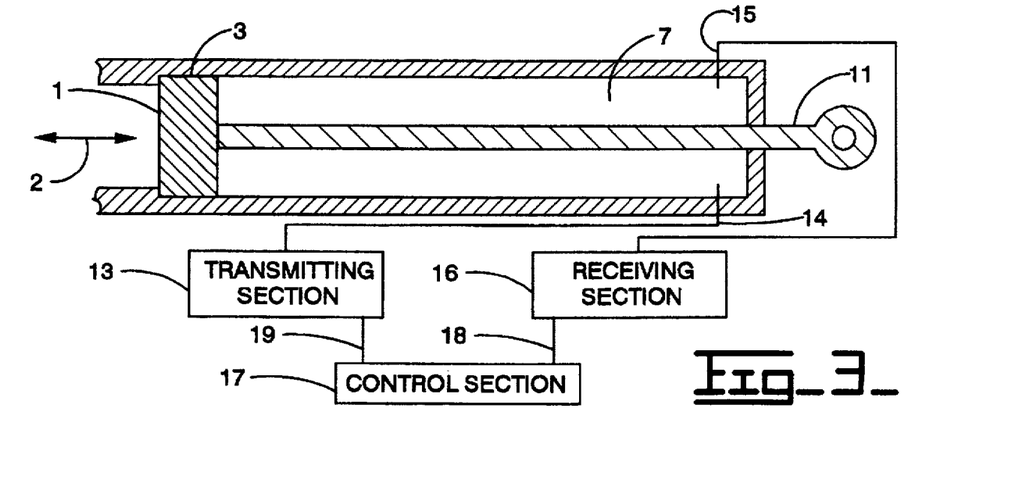
FIG. 3 is a functional block illustration of a hydraulic cylinder electromagnetic wave position sensor having transmitting, receiving and controlling sections.

In FIG. 3 there is a schematic functional block illustration of an electromagnetic wave hydraulic cylinder piston position sensor in which the piston velocity compensation of the invention of the resonance intercepts is employed. In the cylinder 3 the piston 1 and attached rod 11 travels as indicated by the arrow 2 in the cavity 7. A frequency signal, that varies over the range of critical frequencies at which fundamental resonances occur in the cavity 7 in the travel of the piston 1 toward the head 6, is transmitted by the transmitting section 13 into the hydraulic fluid in the cavity 7 via the coupler 14. Frequency signals received at coupler 15 are processed in the receiving section 16, where the presence of a resonance signal is identified by a comparison with a threshold level. A control section 17 communicates with the receiving section 16 and the transmitting section 13 through channels 18 and 19 respectively. The gain of the receiving section 16, in turn, is dynamically changed to provide a signal processing level adjustment at each cycle of processing. In the control section 17 information identified with each resonance signal is converted to count information using a divided sample of the transmitted frequency from the transmitting section 13. The divided sample is used to gate a precision oscillator signal in a counter, the counts of which are proportional to the piston distance travelled. A reference resonance position is stored in tabulated form so that measured resonance width information can be compared with the tabulated information for piston position determination as the piston travels. The table itself may be a table of any resonance width parameter versus the center period of the resonance (Peff) or any other parameter correlated with piston distance.

In extracting piston position information from the type of resonance signal as is depicted in FIG. 2 there a number of considerations related to the shape of the signal and the velocity of the piston that need to be addressed. In electromagnetic wave hydraulic cylinder piston position sensing systems the shape of the peak region and the fact that there are a number of variables related to lot to lot manufacturing differences and items related to use in service, make accurate prediction of insertion loss at resonance impossible.

As examples such variables include but aren't limited to, items such as size, differences between cylinders, any seal leakage both electrical and hydraulic, differences between static and dynamic operation, differences in direction of operation, differences in temperature response, differences in oil such as pressure composition and contamination and differences in performance over the lifetime of the apparatus. Each, and combinations thereof, may affect the ability to accurately determine a resonance frequency. Those variables may be called device and service differences. The effect of many of those device and service differences, the shape of the peak region of the resonance signal itself and variations in the size of the equalization signal may result in non-optimum insertion loss at resonance.

Figures 4, 6:
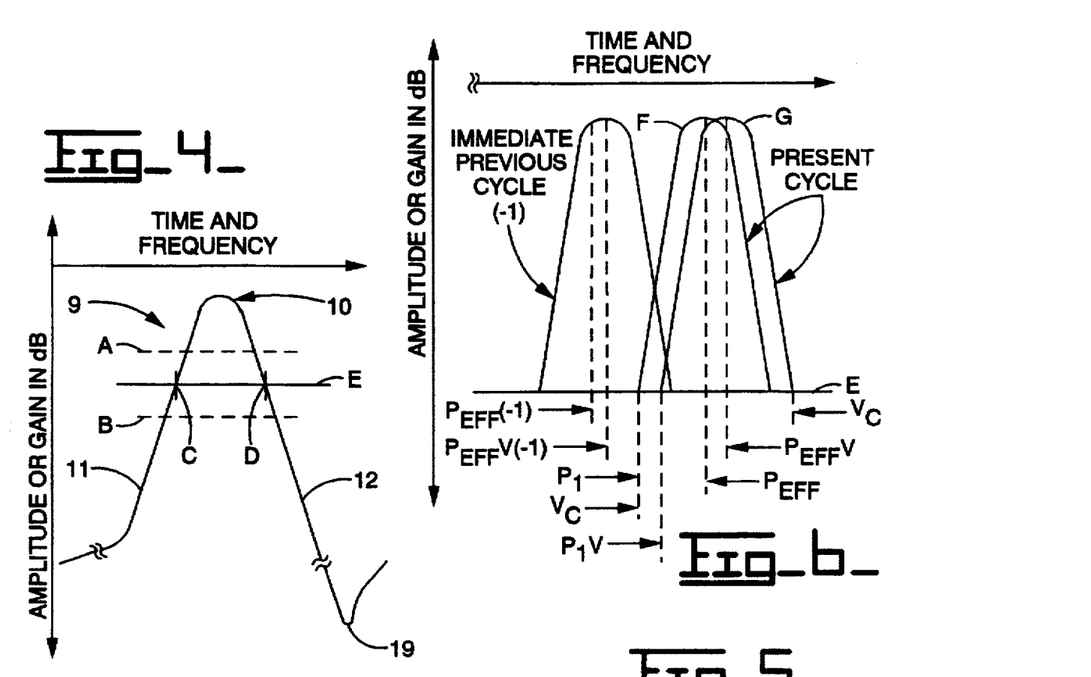
FIG. 4 is a graphical illustration of Gain vs Time and Frequency of the type of electromagnetic wave signal of FIG. 2 depicting the considerations in detecting the positive and negative intercepts with a reference level width parameter.
FIG. 6 is a graphical illustration of Gain vs Time and Frequency of the effect of piston velocity on the positive and negative intercepts of a resonance signal with respect to a reference level and the relative position of the resonance signal in the immediate previous processing cycle.

Referring to FIG. 4, a depiction in the form of a graphical illustration of Amplitude or Gain vs Time and Frequency is provided of the portion near the peak region, of the shape of a typical resonance signal from which information on the resonance signal is to be extracted. The signal 9 has a peak region 10 above a positive slope 11 after which in time is followed a negative slope 12 which often proceeds to an anti-resonance 19. The peak region 10 is noisy and the slope is so gradual that determining a definite resonance width parameter in this region would not be reliable. The positive and negative slopes respectively over the entire slope are highly non-linear. Such conditions would produce problems in mathematical corrections and false locking onto harmonics (cylinder resonance or source) other than the desired one.

In accordance with the invention, the best results are achieved in an operating region between limits A and B at a reference level about 5 dB below the peak region 10. In this operating region, definite and reliable, positive C and negative D slope intercepts of the reference level E with the slopes of the resonance signal can be detected. The frequency separation between the intercepts provide a unique piston position indication. The intercepts C and D occur serially on the time scale and cannot be detected simultaneously. The velocity of the piston in the interval between C and D operates to cause an apparent change in the separation or frequency difference between the positive and negative intercepts C and D. In accordance with the invention, compensation for the movement of the piston during the interval between detection of the intercepts C and D by calculating a velocity based correction using information from a previous processing cycle and then using that calculated velocity based correction to define a new position for the positive intercept C.

Figure 5:
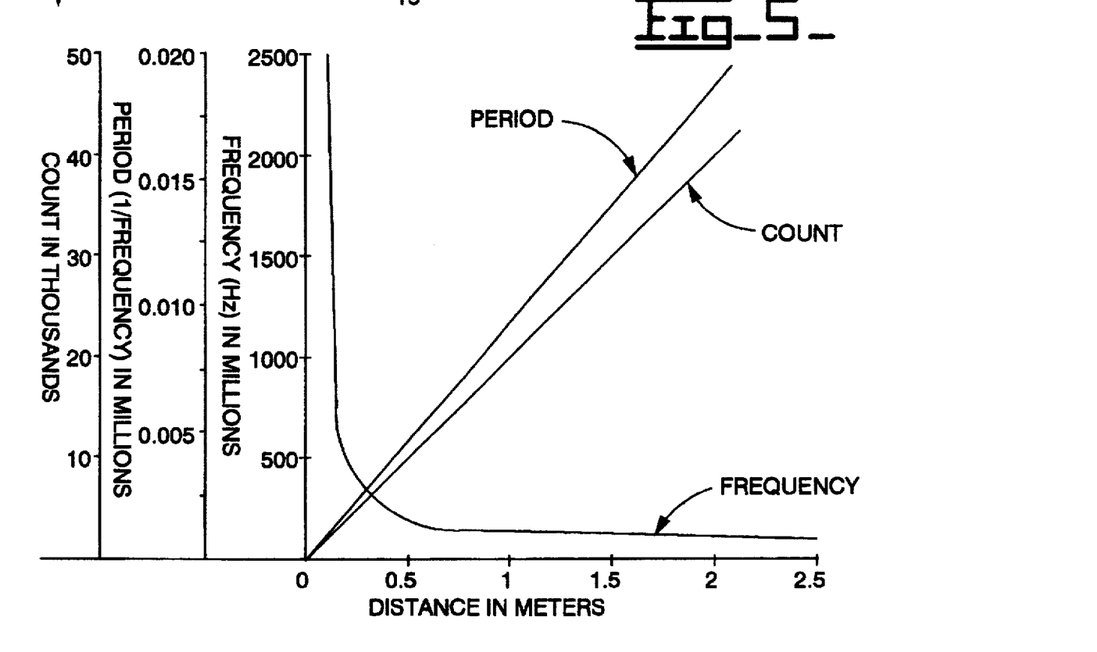
FIG. 5 is a graphical illustration of frequency, period and count variation, correlated with piston travel in the hydraulic cylinder.

The piston velocity calculations and their translation to piston correction are improved where the "period"which is 1/Frequency and which varies linearly with respect to piston position is used. The relationship of Frequency, Period and Counts of a related lower fixed frequency source to piston travel distance are illustrated in FIG. 5. The "period", and the "count" which is proportional to the "period", curves are linear; measured resonance signal width information such as "period of count" is tabulated to be directly correlatable with piston travel.

The piston velocity compensation is developed as depicted in FIG. 6 and as specified in equations 1–4 involving calculating a value for velocity and then using the value in adjusting the position of the initial intercept, which in the example is the positive intercept C of FIG. 4.

In the coming discussion, the following terminology is developed in connection with the figures and the equations 1–4.

The center period of a resonance is labelled Peff. Where a velocity compensation value is applied the designation is PeffV or equivalent expression.

The measured signal identification data is P1 and P2 or equivalent.

The resonance width parameter is the ratio P2/P1 or an equivalent expression that is an indication of the separation between the P1 and P2 intercepts.

The diagram of FIG. 6, which is a graphical representation of gain vs time and frequency at the reference level E of FIG. 4, depicts the time and frequency relationship of the resonance signal at both the immediate previous processing cycle (indicated as (−1) in the figure and equations), and the present processing cycle in terms of the "period" of the frequency values using the example where the piston is moving from an extended toward a collapsed cavity, that is as in FIG. 1 where the piston is moving from 4 towards 5 with the frequency increasing with time. In the FIG. 6 diagram, the positive intercept C of FIG. 4 is labelled P1, and the negative intercept D of FIG. 4 is labelled P2, curve F is the position of the resonance signal at P1 and G is the position of the resonance signal at P2. Referring to FIG. 6, an accurate effective value (Peff) for the center "period" of the resonance is a function of P1 and P2 that can be specified as F(P1 , P2), the simplest example of which would be expressed as in Equation 1.

$$Peff = F(P1, P2) = (P1+P2)/2 \qquad \text{Equation 1:}$$

The velocity correction Vc would be determined as in equation $$Vc = (Peff - Peff(-1))/ Tc \qquad \text{Equation 2:}$$

Where Tc is the elapsed time of the processing cycle. The velocity compensated value P1V for P1 would be determined as in equation 3.

$$P1V = P1 + Vc \cdot Te \qquad \text{Equation 3:}$$

Where Te is the time elapsed between P2 and P1.

The velocity compensated effective value PeffV for the center "period" of the resonance, is a function of P1V and P2 that can be specified as F(P1V , P2), the simplest example of which is as expressed in Equation 4.

$$PeffV = F(P1V, P2) = (P1V+P2)/2 \qquad \text{Equation 4:}$$

Figure 7:
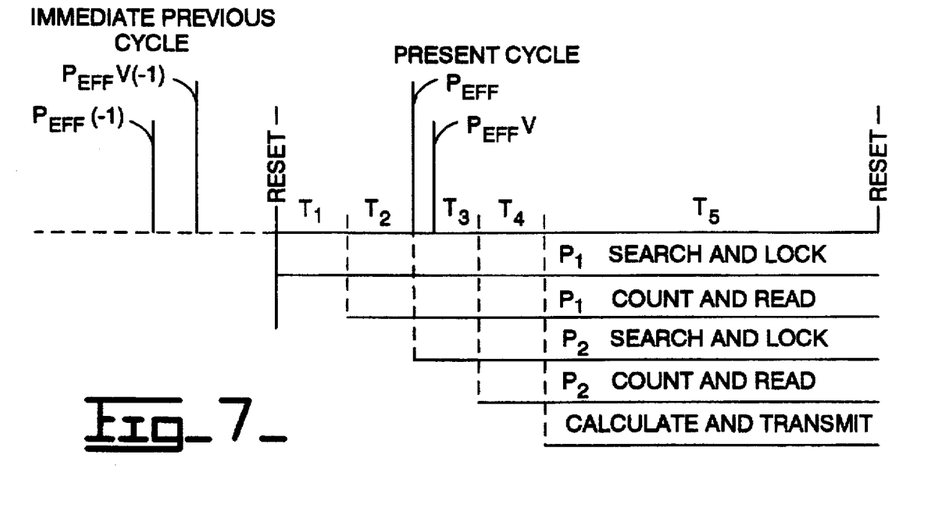
FIG. 7 is a timing chart illustrating the effect of piston velocity compensation in providing a single time value for the position of a resonance signal.

Referring next to FIG. 7 , a timing chart is provided illustrating the relation of the processing cycles and the effect of piston velocity correction Vc on the location of PeffV. In the chart there are five time segments T1 to T5 in a cycle between reset signals. The cycle period includes "search" and "lock" periods for each of the positive and negative "lock on" points, and a calculation and transmission period in which the Peff, Vc, P1V, and PeffV values are established. In FIG. 7, at T1 the search and lock for the positive slope intercept P1 of FIG. 6 takes place followed by a count and read period labelled T2. At T3 the search and lock for the negative slope intercept P2 of FIG. 6 takes place followed by a count and read period labelled T4. In the T5 period the Peff, Vc, P1V, and PeffV values are calculated. In the timing chart of FIG. 7 the addition of Vc to the Peff value moves the Peff position to a position closer to P2. The use of the PeffV value increases reliability of lock onto the negative intercept and increases the accuracy of the dynamic gain adjustment.

BEST MODE FOR CARRYING OUT THE INVENTION

In FIGS. 8–12 there are described the considerations involved and a preferred embodiment of the invention.

While there are a number of ways in the art of detecting a fundamental resonance frequency, in accordance with the invention, the use of "frequency lock loop" circuitry to detect and track "lock on" points on the positive and negative slopes of the resonance signal, together with selection of the location level of those "lock on" points with reference to the maximum amplitude dB and width of the resonance signal at that location level, permits calculations that yield highly accurate resonance frequency values with accommodation for device and service performance differences in the sensing system.

The criteria involved in the selection of the "lock on" level and measurement parameters are illustrated in connection with FIG. 8 wherein, in an illustration is provided of the considerations involved in the selection of the level E of FIGS. 4 and 6.

Figure 8:
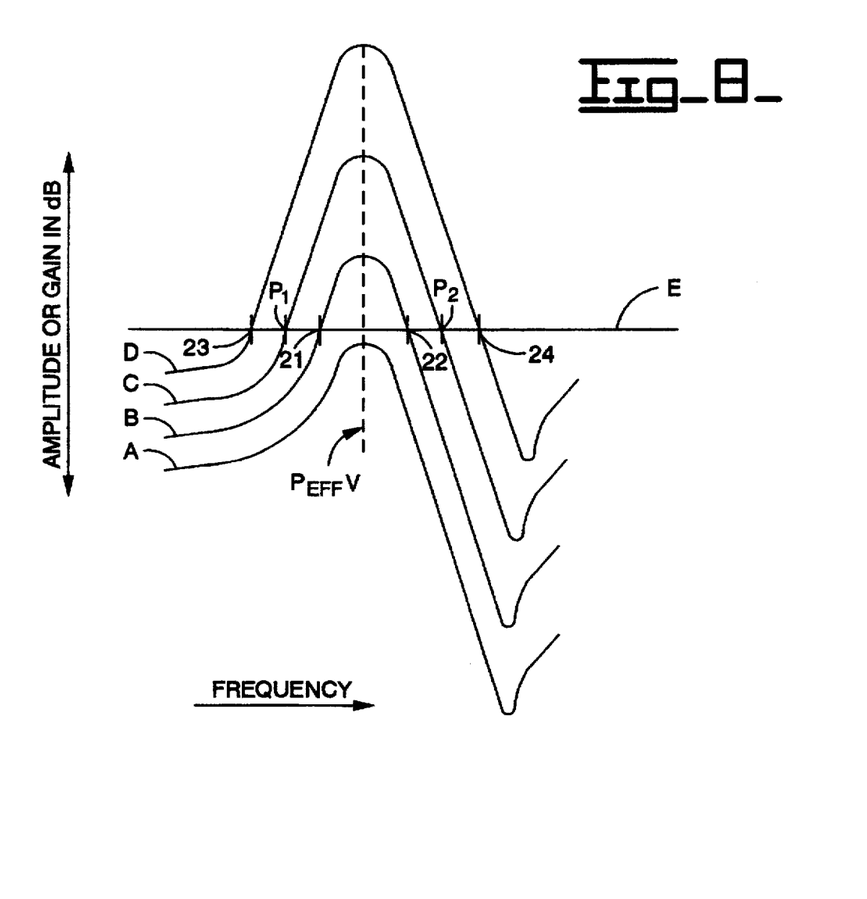
FIG. 8 is an illustration of the considerations involved in the selection and use of lock on points on the positive and negative slopes of a resonance frequency envelope at specific gain levels.

In FIG. 8, four example resonance curves A-D at increasing values of gain or decreasing values of insertion loss, are illustrated with relation to a fixed measurement level positioned at the example 5 dB below peak. The reference line E is the fixed threshold selected level at 5 dB below the resonance peak. PeffV would be the piston velocity compensated center period, divided by the band width at the intercepts of the particular curve with reference level E.

In the selection of the gain level there is a resonance width parameter known as P2/P1V. There are other equivalent width parameters such as loaded "Q". The selected gain level for the reference level E is below the noisy peak region and is typically 5 dB below the peak region. The values of P2/P1V correlated with piston position are tabulated through a characterization operation and stored in a table indexed through PeffV or any other parameter correlated with piston position.

In FIG. 8, in the case of curve A, no "lock on" would be detected because there are no intercepts with the reference level E. A large gain increase of around 5 dB would be indicated. In the case of curve B there are intercepts at points 21 and 22 but the value of P2/P1V with the bandwidth between those intercepts is less than the stored value of P2/P1V at 5 dB below peak. A moderate increase in gain of about 1 dB would be indicated. In the case of curve D there are intercepts at points 23 and 24 but the value of P2/P1V with the bandwidth between those intercepts would be greater than the value of P2/P1V at 5 dB below peak and a moderate decrease in gain would be indicated. In the case of curve C the value of P2/P1V for the bandwidth between the intercepts is equal to the value of P2/P1V for the 5 dB below peak level and would be selected. The positive intercept is labelled P1 and the negative intercept is labelled P2.

As the frequency of the transmitting section 13 of FIG. 3 increases and a "lock on" of a particular resonance occurs at P1 a temporary frequency increment is added that moves the frequency to the vicinity of and slightly beyond P2 so that the frequency lock circuitry can search and lock onto the declining intercept at P2. The velocity compensation of the invention operates to assure that the search for frequency lock on the negative slope will be at the changed location produced by the velocity, which is curve G in FIG. 6.

Figure 9:
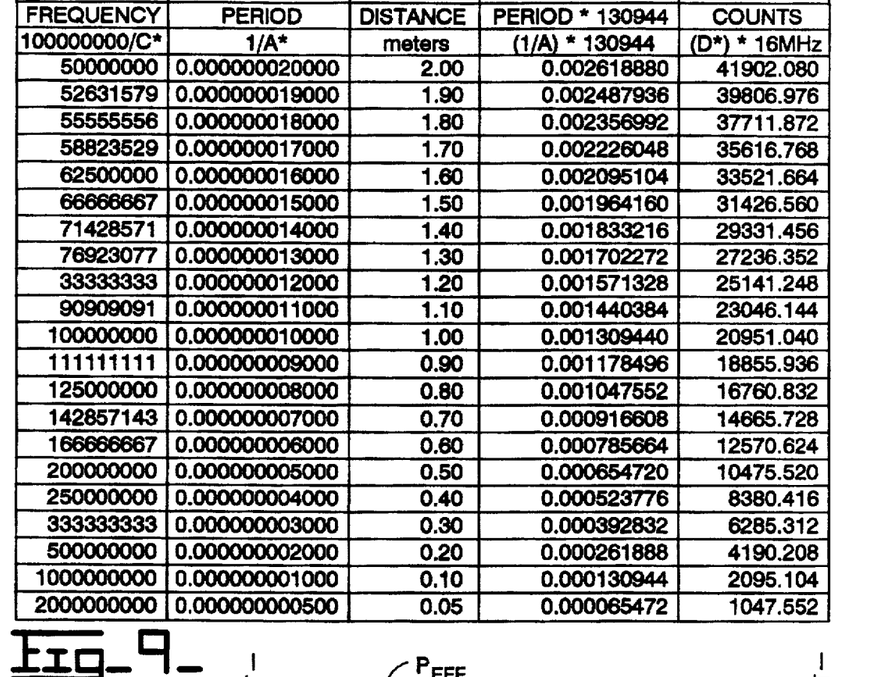
FIG. 9 is an example tabulation of the type of resonance information correlated with piston position that is assembled during characterization of the cylinder.

Each cylinder is individually characterized so that a resonance width parameter that occurs at each piston position is available for comparison with any measured resonance width parameter taken at a piston position in operation. In this embodiment, each cylinder piston position sensing system is statically individually characterized by incrementally moving the piston throughout the cavity or stroke length (between 4 and 5 in FIG. 1) in increments as small as the resolution of the sensing system will permit while the "period" values at P1 and P2 respectively are measured, Vc, PeffV and P1V are calculated and all are stored for each position. In addition the number of "counts" in each resonance at 16 MHz, and, the "period" of each 16 MHz count, the transmitted frequency and the period of the transmitted frequency all correlated with piston travel distance are also tabulated. The stored information provides static measured information of the resonance frequency at each piston position throughout the stroke length. A look up table, an example of which is shown in FIG. 9, is assembled with an appropriate index such as PeffV using the characterization information, and is employed in calculating dynamic gain adjustment and in correlating counts in counters with piston travel. The stored information values that are placed in the look up table may be in the form for use, or calculations may be performed on the measured values, as each is used.

Figures 10, 11:
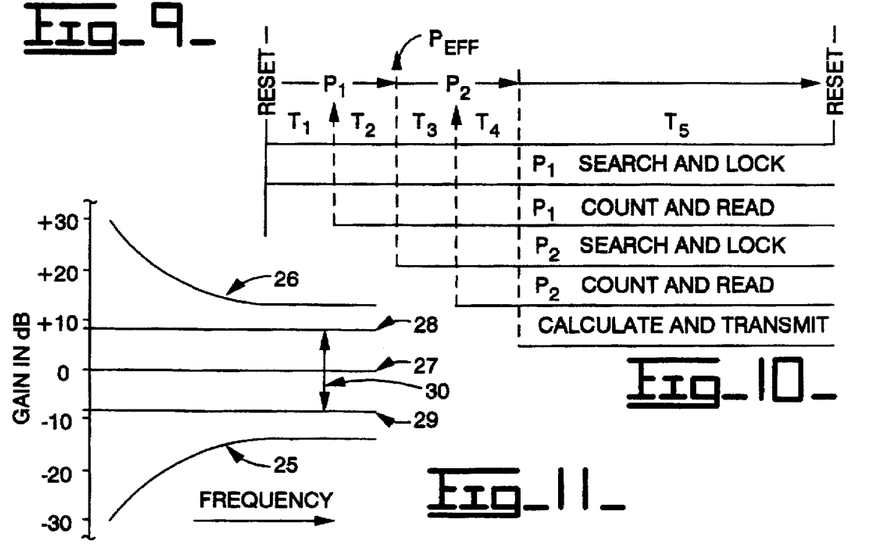
FIG. 10 is a cycle event time chart indicating the type of computations performed.
FIG. 11 is a graphical illustration of the range of the dynamic gain adjustment in the processing.

In FIG. 10, a general cycle event time chart is provided. In the chart there are five time segments T1 to T5 in a cycle between reset signals. The cycle period includes "search" and "lock" periods for each of the positive and negative frequency "lock on" points, and a calculation and transmission period in which the PeffV, P1V, Vc, and P2/P1v values are established, comparison is made with the value from the "look up" table and a determination of the dynamic gain change, that is to be made, followed by transmission of the gain change, takes place. The gain change is then used at the next cycle.

In FIG. 10, at Ti the search and lock for the positive slope intercept P1 of FIG. 6 takes place followed by a count and read period labelled T2. At T3 the search and lock for the negative slope intercept P2 of FIG. 6 takes place followed by a count and read period labelled T4. In the T5 period the PeffV, P1V, Vc and P2/P1V are calculated and transmitted for a comparison operation with the look up table value and an adjustment signal of up/down and amount information is transmitted for dynamic gain adjustment. The events of the chart of FIG. 10 are executed each cycle. An actual adjustment change only occurs when needed.

Referring to FIG. 11 there is shown a graphical illustration of the range of the dynamic gain adjustment. In FIG. 11 the curve 25 corresponds to the curve 8 of FIG. 1 and the curve 26 is an equalizer signal curve estimated to be equal and opposite to curve 25 as described in U.S. Pat. No. 5,182,979. The combination of the two gain values at each point results in a gain reference, labelled element 27, with a 0 dB slope.

In accordance with the invention, a dynamic gain adjustment of the order of the separation between curves 25 and 26 is available for increased precision. A dynamic gain variation for example of +7 dB at 28 to −7 dB at 29 659 will result in a satisfactory dynamic gain adjustment range labelled element 30. A dynamic gain adjustment in that range will provide any needed attenuation or incrementation to the gain to make up for any error in the equalization signal estimate, and to keep the signal in the receiving section of FIG. 3 within a threshold range within each processing cycle.

The dynamic gain adjustment of the invention involves a loop, that compares measured frequency information at a detected resonance frequency with stored resonance frequency values established for the particular cylinder involved, and adjusts the gain in response to keep within the threshold range and to permit narrower threshold ranges for greater sensitivity.

The dynamic gain adjustment signal development includes a comparison operation that compares measured resonance frequency information appearing at a channel 18 when resonance is detected at a point in piston travel, with a value in a "look up" table that contains a tabulation of resonance frequency information that was compiled and stored in a characterization operation for the particular cylinder for all piston positions over the length of piston travel. The comparison operation, provides, through the communication channel 18 of FIG. 3, to an adjustment element in the receiving section 16, an adjustment "direction" signal of "up" or "down" to indicate whether the adjustment is to be an increment or an attenuation, and also provides an "amount" signal to the adjustment element based on how large the difference is between the detected resonance frequency and the value in the "look up" table.

The amount signal is applied in increments such as 1 dB each cycle until the system no longer calls for a change. The incremental signal application operates to control regulation of the system and to prevent upset by spurious signals.

The dynamic gain adjustment loop thus changes the gain continuously in limited increments as the piston in FIG. 1 moves back and forth in the cylinder 2 in correspondence to the stored resonance frequency values for the various piston positions.

Figure 12:
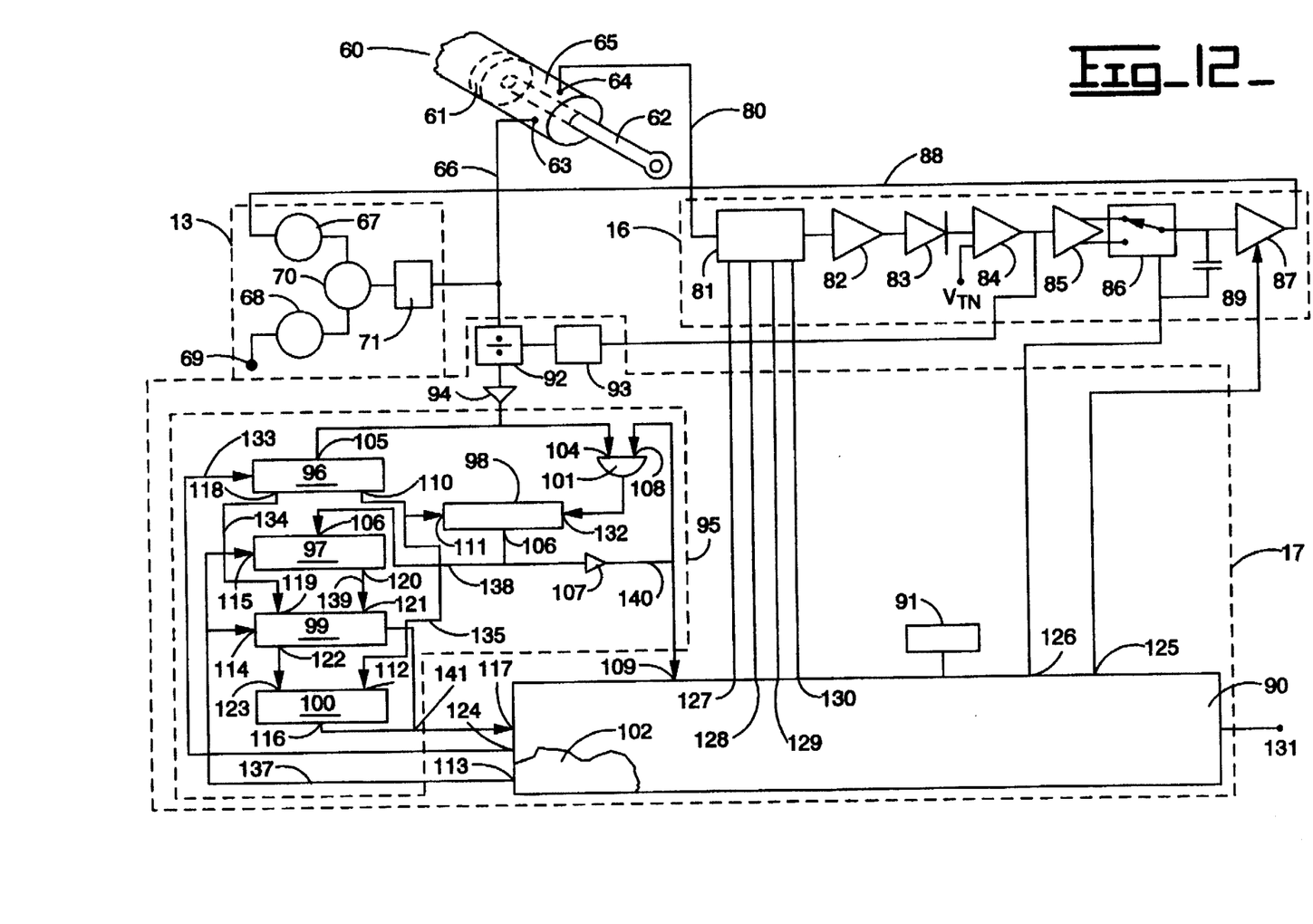
FIG. 12 is a functional block diagram of an embodiment of the invention employing dynamic step attenuation gain adjustment.

In FIG. 12 there is shown a functional block diagram of a preferred embodiment of the invention employing calculation based step attenuation of the detected signal in dynamic gain adjustment.

Referring to FIG. 12, the cylinder coupling is that of the direct adjacent coupler separation with an odd multiple of that separation in the opposite path around the circumference of the cylinder, as described in copending application filed simultaneously herewith (Caterpillar Docket No. 93-3661), as applied to the rod side of the piston in the cylinder. In the cylinder 60, the piston 61 is shown dotted on the rod 62. The transmit 63 and receive 64 couplers are mounted 90 degrees apart on the peripheral circumference of the cylinder 60 with two selected length dummy couplers (not shown) each at a further 90 degree separation on the peripheral circumference of the cylinder 60 from an adjacent transmit coupler 63 or receive coupler 64. The hydraulic fluid containing cavity 65 is coaxial with four fold symmetry wherein standing wave propagation is in the (TEM) mode and adjacent modes are suppressed. Strong, well defined, signals are produced at each resonance over the full travel of the piston 62 in the cylinder 60.

In general operation, in piston sensing signal processing, in a transmitting section, a frequency signal is introduced into the cavity 65 that varies in frequency over a range that would include all the resonance frequencies of all cavity lengths that would correspond to the full piston travel. In a receiving section, the frequency signals of the fundamental resonances received at each increment of piston travel, are compared with a threshold level and through comparator circuitry and computation the particular resonances are correlated with piston position and the related aspects velocity and acceleration. In this invention as illustrated in FIG. 11, dynamic step adjustment is performed.

In FIG. 12, the transmitting section 13 of FIG. 3, shown in dotted outline, involves elements 66–71 which deliver the input frequency signal through conductor 66 to input coupler 63. Two voltage controlled oscillators 67 and 68 are used in the presence of a voltage signal at terminal 69 to produce a beat signal that covers the range, for example from 50MHz to 1800 MHz, of resonance frequencies to be encountered in the piston travel. At the low frequency, about 50 MHz, both oscillators 67 and 68 are at about 5000 MHz, whereas at the high frequency, about 1800 MHz, one oscillator would be at about 5000 MHz and the other would be at about 3200 MHz. The outputs of the oscillators 67 and 68 are combined in a balanced mixer 70 the output of which is passed serially through a low pass filter 71.

The receiving section 16 of FIG. 3, shown in dotted outline, involves elements 81–89, delivers from coupler 64, on conductor 80 the resonance frequency signals processed at each cycle of the timing chart. In receiving section 16 the signals pass through a selectable attenuator element 81, an amplifier equalizer element 82, a detector element 83, to a threshold comparator 84. The selectable attenuator element 81, which can be positioned either in the path of conductor 66 or as shown in the path of conductor 80. It dynamically adjusts the gain or signal processing reference within the range 30 of FIG. 11. The adjusting member 81 receives a four bit adjusting instruction which provides "up/down" and "quantity" information that increments or attenuates the signal. The adjusting instruction is developed in a comparison operation compares a correlated value from the tabulated characterization information that has been stored in a memory element such as element 91 with the particular value at hand and where a difference greater than the threshold range is detected, an adjustment signal is provided. The adjustment is applied in 1dB increments each processing cycle until fully applied. The amplifier equalizer element provides an impedance that is substantially equal to the inverse of that of the cylinder 60 so as to match the curve 25 of FIG. 11 with the curve 26 of FIG. 11 and thereby produce the net zero slope reference 27 of FIG. 11. The detector element 83 provides a signal indicative of the amplitude for use in a comparison with a constant threshold voltage in the threshold comparator element 84. The range 30 of FIG. 11 is within the threshold.

When the signal indicates "lock on" or comparison in element 84 the intercept P1 of FIG. 6 has been reached. The signal from element 84 enters an invert-non invert amplifier 85 and select switch 86 to an integrator 87 having an output that feeds back to the voltage controlled oscillator 67 through conductor 88. The invert non-invert amplifier 85 and select switch 86 inverts the signal from element 84. Capacitor 89 is connected between line 126 and the input of the integrator 87. The voltage on line 126 controls the position of select switch 86 and creates a charge spike from capacitor 89. During voltage changes the charge spike from capacitor 89 temporarily increases the frequency of the oscillator 67 sufficiently to be near but beyond the declining portion of the resonance envelope so that the frequency locked loop circuitry locks on and establishes the intercept P2 of FIG. 6. The operation is reversible. The circuitry also moves the frequency locked loop from the intercept P2 to the intercept P1.

The control section 17 of FIG. 3 involving elements 90–131 shown in dotted outline, includes a controller element 90, a "look up" store element 91 with an output into the controller 90, a prescaling element 92, with an enabling capability, having an input connected to the output of element 71 of the transmitting section 13 and an enabling input connected to a lock detecting element 93, the input of which is connected to the output of the threshold comparator 84. The output of the prescaling element 92,through a back circuit inhibiting diode 94 is the input to a counting means 95, enclosed in a dotted line, that develops position information. The counting means is made up of: a first flip-flop 96 of the "D" type having a "SET" input, a "RESPONSE" input and "POSITIVE" and "INVERTED" outputs; a second "D" type flip-flop 97; a first counter 98; a second counter 99; a third counter 100; an "And" element 101 and a precision oscillator 102, that delivers square 16 MHz pulses that have sufficient definition to be sensed separately on leading and trailing portions, and which is located in the controller 90.

The output of the element 94 is connected to an input 103 of flip-flop 96 and to input 104 of "and" element 101. The output 105 of counter 98 is connected to an input 106 of flip-flop 97, serves through a back circuit inhibiting diode 107 as the remaining input 108 of "and" element 101 and also serves as an input 109 to the controller 90. The inverted output 110 of the flip-flop 96 is connected to input 111 of counter 98 and to one input 112 of counter 100. The output 113 of the precision oscillator 102 is connected to input 114 of counter 99 and to input 115 of flip flop 97. The output 116 of counter 100 is connected to the input 117 of the controller 90. The positive output 118 of flip-flop 96 is connected to input 119 of counter 99, which carries the overflow of counter 99 to counter 100. The output 120 of flip-flop 97 is connected to input 121 of counter 99. The output 122 of counter 99 is connected to input 123 of counter 100. The controller 90 provides reset signals at terminals 124 and 125 respectively to flip-flop 96 and integrator 87, and it also provides a select signal to the switch element 86 on conductor 126. The controller 90 in addition to providing position related computations also performs the comparison operation of element 38 in FIG. 7 using "look up" data from element 91 and information from the counting means 95 to deliver up/down direction signals and amount signals on conductors 127-130 to the selectable attenuator 81. The controller 90 also has an external utilization output 131 for the delivery to an external utilizer of piston position, and related velocity and acceleration information.

In order to provide a starting place in practicing the invention the following counting example and specifications are provided. The components are standard elements in the art. For definition purposes, when a counter is "cleared" it cannot operate and all outputs are zeros; and when a flip flop is "cleared" it is operable, the "SET" terminal is high, the positive output is zero, and the invert output is 1.

In operation the counter is synchronized under the following conditions.

The controller 90 holds the "RESET" terminal of the flip-flop 96 low which retains the flip flop in a cleared condition. In this condition the positive output 118 is low which holds input 119 so that counter 99 is in a cleared condition whereas the inverted output 110 of flip-flop 96 is high which holds counters 98 and 100 in the reset condition. The output 105 of counter 98 being low holds flip-flop 97 through terminal 106 in a cleared condition which in turn causes the inverted output 120 thereof to be high and enable counter 99 at terminal 121 even though counter 99 is being held in a cleared condition by the condition of flip-flop 96. The high condition of terminal 108 enables the "and" element 101. The transmit section frequency, divided by 256 is impressed at terminals 103 and 104, and because the "and" gate 101 is enabled it is also impressed on the counter 98 at terminal 132. The counting is enabled by the controller changing the reset signal at terminal 124 from low to high which in turn is impressed via line 133 on the "RESET" terminal of the flip flop 96. Lines 134 and 135 do not change.

The synchronized count of counters 98 and the 99-100 combination begins with line 136 going from low to high when the lock detect element 93 enables the element 92 that provides a divided source of the transmitted frequency. Line 134 changes from low to high, enabling counter 99 which counts the rising edges of the 16 MHz pulses impressed via line 137. No time conflict exists because lines 134 and 137 are asynchronous. Line 135 changes from high to low, which enables counters 98 and 100. Counter 98 counts the trailing edges of the pulses passing through "and" 101 and impressed at input 132. No time conflict exists on the counter 98 start up because counter 98 is enabled on the leading edge of line 136 whereas the count is based on the trailing edge of the pulses.

The synchronized count of counters 98 and the 99-100 combination stops when the counter 98 counts to the effective equivalent of a scaled period of a resonance. For an example where the period is 130944 cycles, a division in element 92 of 256 would yield 511.5. At the example count of 511.5, the 0.5 being the trailing edge of the last count, line 138 changes from low to high removes flip flop from the cleared condition so that the next low to high transition on line 137 (the next leading edge of a 16 MHz pulse) causes line 139 to go low which stops the count in the 99-100 counter combination. No time conflict exists in the count stopping because the transport delay of flip flop 97 guarantees that the 99-100 counter combination will have had time to complete all in process transitions before the counting process is disabled by line 139 going low. Line 140 changes from high to low which is a signal to controller 90 that the count is complete. Line 140 also disables "and"101 which stops counter 98. No time conflict exists because all "in process" transitions in the counters are complete before the count is stopped. The controller reads the counters via line 141 at times T2 and T4 of the timing cycle. The counting cycle repeats when the controller 90 again changes the reset line 133 from low to high.

EXAMPLE SPECIFICATIONS ARE AS FOLLOWS

An satisfactory operating voltage is about +24 V. D.C.

The signal transmitted on conductor 66 to coupler 63 varies from about 50 MHz to about 1.6 GHz.

A satisfactory prescaler element 92 is a model MB506 manufactured by FUJITSU and set to divide by 256.

A satisfactory selectable stepping attenuator 81 is the AK0020Y-24 model manufactured by Alpha Industries, which provides 0-15 dB attenuation in equal steps.

The lock detector element 93 is a standard window comparator in the art made up of parallel connected comparators.

The "look up" table store, element 91, is a standard programmable read only memory element, some models of which are referred to in the art as PROMS. A satisfactory PROM model is the TMS27PC512 model manufactured by Texas Instruments(TI).

The controller element is a standard microprocessor in the art. A satisfactory microprocessor is the MC68HC11 model manufactured by Motorola, of Roselle Ill.

The counter elements 98 and 100 are standard integrated circuits in the art. A satisfactory integrated circuit model is the 74HC 4040 manufactured by Motorola.

The counter element 99 is also another standard integrated circuit in the art. A satisfactory integrated circuit model is the 74HC161 manufactured by Motorola.

The "D" type flip flop may be the model 74 HC74 manufactured by Motorola.

The element 89 is a 200 picofarad capacitor.

It will be apparent that while the elements of the counting means 95 are illustrated for clarity as a discrete assembly, the elements and functions could readily be incorporated into the controller by providing the capacity therein.

What has been described is a piston position sensing system in which tabulated resonance signal width related information is stored in a form correlated with piston travel so that measured resonance signal width information can be compared with the stored information in determining piston position and development of compensation for the velocity of the piston in hydraulic piston position sensing by providing a correction that compensates for a time difference in serial sensing between the initial and the following extremes of a resonance signal as the piston moves. The compensation is developed from velocity information identified through previous and current processing cycles. The correction assures reliability in detection of the subsequently sensed slope of the resonance and enhanced sensitivity and accuracy through automatic application incrementally in a dynamic gain adjustment of the sensing system.

What is claimed is:

1. In a hydraulic cylinder piston position sensing system of the type wherein electromagnetic wave resonance signals are correlated with the position of the piston, the improvement comprising:

the compensation of measured resonance signal identification data by a velocity dependent to a first detected slope intercept period P1 of a said resonance signal.

2. The process of establishing the piston position in a hydraulic cylinder piston position sensing system that employs resonance envelope signals as indicative of piston position comprising the steps:

characterizing each cylinder by storing information in tabulated form correlated with piston travel, on at least one resonance width parameter value, for each piston position, introducing electromagnetic wave energy into the hydraulic fluid in said cylinder said electromagnetic wave energy varying in frequency through a range that includes all resonance frequencies of all positions of said piston, sensing resonance signals in said hydraulic fluid during travel of said piston;

detecting the presence of at least one width parameter of at least one said resonance signal during travel of said piston;

measuring at least said at least one width parameter of at least one resonance during said piston travel;

compensating said measured resonance width parameter for piston velocity; and comparing at least one compensated measured resonance width parameter as the piston travels with at least one stored resonance width parameter and based on said comparison providing a piston position signal.

3. The improvement of claim 1 wherein said compensated measured signal identification data is used to calculate a compensated resonance width parameter.

4. The improvement of claim 1 wherein said compensated measured signal identification data is used to calculate piston position.

5. The improvement of claim 4 wherein a velocity compensated effective value for the center period of the resonance signals PeffV is calculated from compensated measured signal identification data.

6. The improvement of claim 1 wherein said velocity dependent correction is dependent on measured signal identification data of a previous processing cycle.

7. The improvement of claim 1 wherein said velocity compensation is dependent on the elapsed time of a processing cycle.

8. The improvement of claim 3 wherein said signal identification data are first and second detected slope intercept periods P1 and P2.

9. The improvement of claim 3 wherein said compensated resonance width parameter is determined from the ratio between a said second and a velocity corrected first detected slop intercept P2/P1V.

10. The improvement of claim 3 wherein said resonance width parameter is compared for any difference with a previously stored tabulated resonance width parameter value correlated with a piston position, said difference value forming a system adjustment signal for system gain adjustment at or about 1 dB per processing cycle rate.

11. The improvement of claim 6 wherein measured signal identification data is at a reference level that corresponds to a system gain level that is about 5 dB lower than the peak region of said resonance signal.

12. Apparatus for sensing the position of a piston in a hydraulic cylinder comprising in combination:

storage means adapted for storing information on at least one resonance width parameter of a resonance in the hydraulic fluid in said cylinder;

said storage means being further adapted to store said information in tabular form correlated with piston travel;

transmitting means adapted for introducing electromagnetic wave energy at a first coupler into the hydraulic fluid in said cylinder between said piston and the end of said cylinder, said electromagnetic wave energy varying in frequency through a range that includes all resonance frequencies of all positions of said piston, receiving means adapted for sensing resonance signals delivered through a second coupler in said hydraulic fluid during travel of said piston;

said receiving means being further adapted to detect the presence of at least one resonance width parameter related portion of at least one said resonance during travel of said piston;

processing means adapted to measure at least one velocity compensated resonance width parameter at a reference level, of at least one resonance during said piston travel; and said processing means being further adapted to compare at least one measured resonance width parameter as the piston travels with at least one stored resonance width parameter and based on said comparison provide a piston position signal.

13. The apparatus of claim 12 wherein said velocity compensated resonance width parameter is developed employing present and immediately previously processed resonance width parameter information.

14. The apparatus of claim 13 wherein said reference level is below, on the gain scale of said system, the peak region of said resonance.

15. The apparatus of claim 14 including compensation for the velocity of said piston applied in said processing means to measured resonance signal identification data.

16. The apparatus of claim 14 wherein said compensation for velocity is a correction applied to said measured resonance signal identification data.

17. The apparatus of claim 16 wherein said resonance signal identification data are first and second detected slop intercept periods P1 and P2.

18. The apparatus of claim 17 wherein said processing means processes resonance information in cycles during piston travel and said velocity correction is an increment based on a previous processing cycle piston velocity value.

19. The apparatus of claim 18 wherein said resonance width parameter value is compared for any difference in value from a previously stored tabulated value corresponding to the same piston position, said difference in value forming a system adjustment signal to be applied to the gain of said system.

20. The apparatus of claim 19 wherein said adjustment is applied at an about 1 dB per processing cycle rate.

21. The apparatus of claim 20 wherein said resonance width parameter is measured at a gain level that is typically about 5 dB lower than the peak region of said resonance.

22. The process of claim 2 wherein said compensating step there is included the step of:

introducing piston velocity compensation in said measured width parameter by calculating a piston velocity correction based piston velocity in an immediate previous processing cycle and adding the correction value to an average based value derived from said resonance width parameter.

23. The process of claim 22 including the step of:

attenuating the gain of said piston position sensing system based on a difference between a piston velocity compensated measured resonance width parameter signal value for a piston position, with a resonance width parameter signal value for the same piston position stored during said characterization step.

24. The process of claim 23 including the step of:

applying the gain attenuating signal based on said difference at a 1 dB per processing cycle rate.

* * * * *

UNITED STATES PATENT AND TRADEMARK OFFICE
CERTIFICATE OF CORRECTION

PATENT NO. :  5,710,514

DATED      :  January 20, 1998

INVENTOR(S) :  John W. Crayton, et al.

It is certified that error appears in the above-identified patent and that said Letters Patent is hereby corrected as shown below:

Column 13, line 16, insert --correction-- after "dependent"

Signed and Sealed this

Seventh Day of April, 1998

Attest:

BRUCE LEHMAN

Attesting Officer

Commissioner of Patents and Trademarks